W. G. VETTER.
SHIELD FOR AUTOMOBILE RADIATORS.
APPLICATION FILED DEC. 28, 1916.

1,244,802.

Patented Oct. 30, 1917.
2 SHEETS—SHEET 1.

Witness
H. Woodard

Inventor
W. G. Vetter
By H. B. Wilson & Co.
Attorneys

W. G. VETTER.
SHIELD FOR AUTOMOBILE RADIATORS.
APPLICATION FILED DEC. 28, 1916.

1,244,802.

Patented Oct. 30, 1917.

Witness
H. Woodard

Inventor
W. G. Vetter
By H. B. Wilson & Co.
Attorneys

UNITED STATES PATENT OFFICE.

WALTER G. VETTER, OF ALVA, OKLAHOMA.

SHIELD FOR AUTOMOBILE-RADIATORS.

1,244,802.   Specification of Letters Patent.   Patented Oct. 30, 1917.

Application filed December 28, 1916. Serial No. 139,399.

*To all whom it may concern:*

Be it known that I, WALTER G. VETTER, a citizen of the United States, residing at Alva, in the county of Woods and State of Oklahoma, have invented certain new and useful Improvements in Shields for Automobile-Radiators; and I do declare the following to be a full, clear, and exact description of the invention, such as will enable others skilled in the art to which it appertains to make and use the same.

This invention relates generally to automobiles, but more particularly to certain new and useful improvements in shields for the radiators thereof.

The water cooling system of an internal combustion engine for an automobile is usually designed to radiate heat from the engine with sufficient rapidity to maintain the engine at an efficiently operative temperature in warm weather. Consequently, when an automobile is operated in cold weather, it is found that the cooling system carries the heat away from the engine so' rapidly that its temperature is reduced below the point at which it can operate at its highest efficiency. In severe weather the reduction in temperature produced in this manner is sufficient to make a very noticeable change in the operation of the engine and often is sufficient even to cause the water in the lower part of the radiator to freeze while the engine is running. In order to overcome this difficulty, some kind of a covering for part of the radiator is often used in cool weather, but this expedient is unsatisfactory for the reason that the amount of radiator surface required to be covered varies so much with the temperature of the air and with operating conditions that it is impracticable for an operator to control the temperature of his engine properly in this manner.

The present invention has for its primary object to devise means for controlling automatically the rate of radiation of heat by the water cooling system in such a manner as to maintain the engine at substantially all times during its operation at an efficiently operative temperature.

With this and other objects in view, the invention resides in certain novel features of construction, and the combination and arrangement of parts, which will be hereinafter fully described and claimed.

In the accompanying drawings forming part of the application and in which similar reference characters designate like parts throughout the several views.

Figure 1:
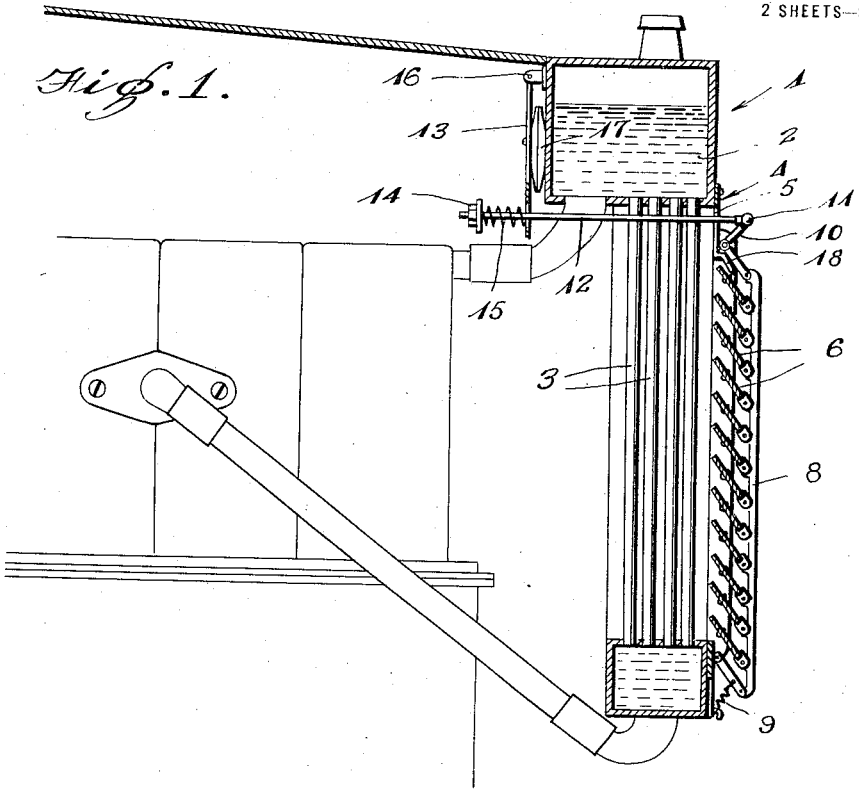
Figure 1 is a vertical sectional view through an automobile radiator and a portion of the hood connected to the same, showing a device constructed in accordance with this invention applied thereto and in partly open position.
Figure 4:
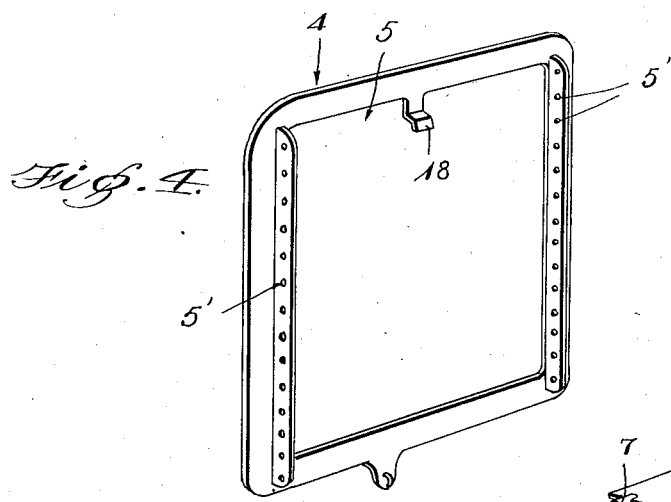
Fig. 4 is a perspective view of the frame detached from the radiator.
Figure 5:
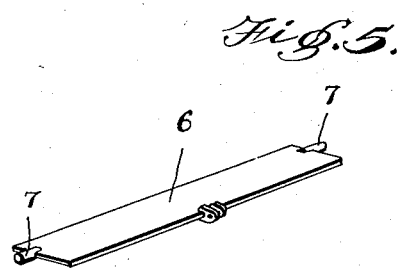
Fig. 5 is a similar view of one of the shutters detached from the frame.
Figure 2:
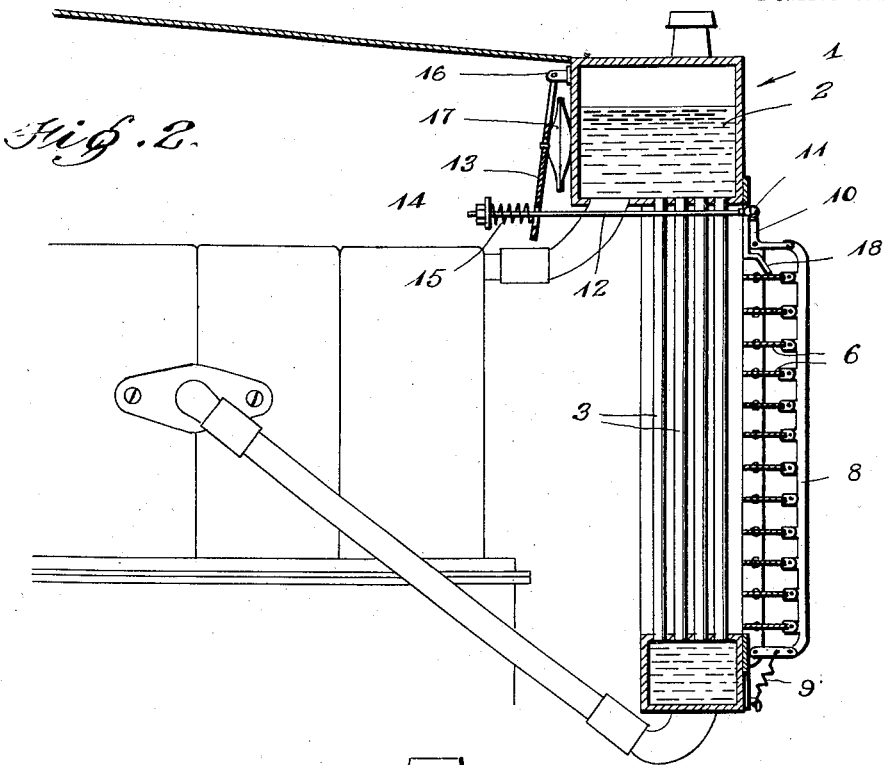
Fig. 2 is a view similar to Fig. 1 showing the parts of the device in completely opened position.
Figure 3:
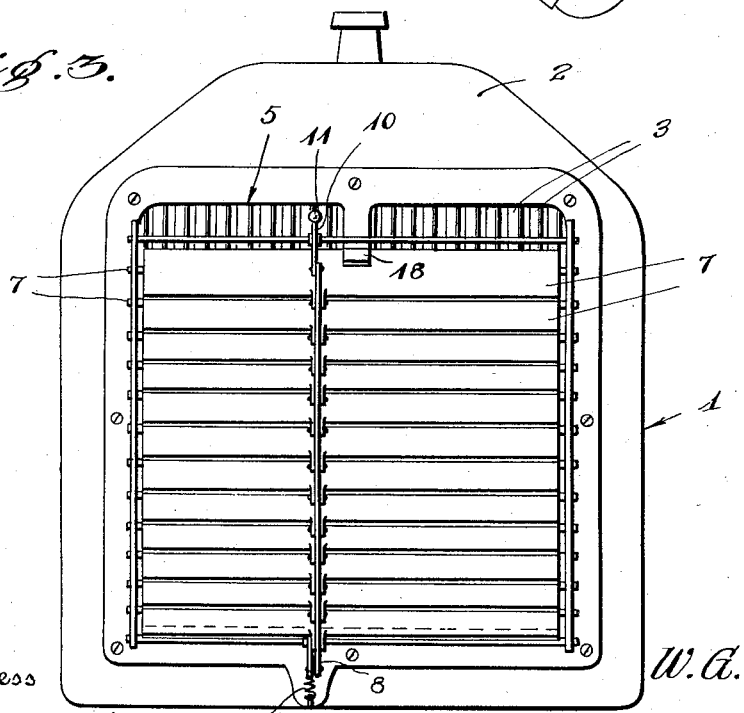
Fig. 3 is a front elevation of the radiator and device applied thereto.

In the embodiment illustrated, the reference numeral 1 designates the radiator of an automobile having the usual top receiving tank 2, which is generally of a greater width than the body portion of the radiator. The body portion of the radiator is provided with the usual vertically arranged tubes 3 between and around which air from the outside of the automobile hood passes to the interior of the same and during its passage causes a reduction in the temperature of the water contained in the radiator.

Fitted upon the forward end or front of the radiator in any convenient manner is a frame 4, the latter being provided with an opening 5 of an area substantially equal to the space containing the open portion of the radiator, and being provided with a plurality of alined bearings 5' on its opposite sides. It is to be here noted that the frame 4 may be constructed or shaped to fit the radiators of all sizes and makes of automobiles and may be applied thereto in the most practical way.

The reference numeral 6 designates a series of horizontally extending shutters having, at points intermediate of their widths, longitudinally extending trunnions 7 which are revolubly mounted in the above mentioned bearings 5'. The forward edges of the shutters 6 are pivotally connected to a vertical bar 8. This forms a means whereby when motion is imparted to the bar, all of the shutters may be simultaneously operated.

To hold the shutters in their closed positions, the lower end of the bar 8 is connected to one end of a coil spring 9, the other end of which is connected to the frame 4 in any convenient manner. To raise the bar 8 in order to open the shutters, the upper end of the former is connected to one end of a bell crank 10, the other end of the latter being connected by a suitable swiveled joint 11 to the forward end of a substantially horizontal link 12. The rear end of this link 12 extends through an aperture in the lower end of a substantially vertically disposed arm 13, and is provided with an adjusting nut 14, between the inner end of which and the rear side of the arm 13 is disposed a coil spring 15, which as shown, surrounds the link 12. By this construction, a yieldable connection is provided between the link 12 and the arm 13.

This arm 13 is pivotally connected at its upper end to a bracket 16 which is fixed to the back of the receiving tank 2 of the radiator in any suitable manner, and directly above a thermostat 17.

The thermostat employed is preferably of the well known "wafer" type and is fixed to the back of the receiving tank 2, resting flat up against the same so that the heat from the water contained in said tank may be radiated to it.

During hot weather, the thermostat will be expanded a sufficient amount to normally maintain the link 12 in its rearmost position, and consequently the shutters 6 in their open position, a stop 18 being provided at the upper edge of the opening 5 in the frame 4 to limit the movement of the shutters. When, however, the weather is cold and there would be a tendency for the water in the radiator to drop in temperature when the engine is not running, the thermostat contracts and causes the spring 9 to automatically close the shutters, and when closed will provide an efficient shield for preventing the water in the radiator from cooling to an undesirable temperature. The shutters may only be partially closed, owing to the temperature of the water in the radiator and consequently more or less air is allowed to pass through the radiator.

The above described device will be found very practicable for use in cold weather, for when the engine is shielded from the air when standing, it will not cool so readily, and less difficulty will be experienced in starting it. Even if the engine is running and the cold air passing through the radiator greatly reduces the temperature of the water in the same, the shutters will be automatically operated to partially close them so that only sufficient air will be admitted to lower the temperature of the water to the most effective degree.

From the foregoing description taken in connection with the accompanying drawings, the construction, use and operation of the device will be understood without a more extended explanation.

As various changes in form, proportion, and in the minor details of construction may be resorted to without departing from the spirit of this invention, I do not wish to be limited to the construction herein shown and described other than as claimed.

I claim:—

In an automobile, the combination with the radiator thereof, of a frame removably secured to the front of said radiator, a series of shutters pivoted to said frame to obstruct more or less the flow of air through said radiator, a bar connecting said shutters to operate them simultaneously, a bell crank mounted upon said frame and connected to one end of said bar, a coil spring connected at one end to said frame and having its other end connected to said bar to normally hold said shutters closed, a stop carried by said frame to limit the opening movement of said shutters, a wafer thermostat fixed to the back of the receiving tank of said radiator and resting flat up against the same, a bracket fixed to the back of said tank above said thermostat, a substantially vertically disposed arm pivoted at its upper end to said bracket and having its intermediate portion connected to said thermostat, and being provided at its lower end with an opening, a substantially horizontally disposed link connected at its forward end to said bell crank to rock the same and having its other end projecting through the opening in said arm, a nut threaded upon said other end of said link, a coil spring surrounding said link and disposed between said arm and said nut.

In testimony whereof I have hereunto set my hand in the presence of two subscribing witnesses.

WALTER G. VETTER.

Witnesses:
  J. B. SCHAEFER,
  O. H. MANNTEL.